Aug. 28, 1951  M. MENNESSON  2,565,616
PRESSURE REGULATOR
Filed Jan. 21, 1948
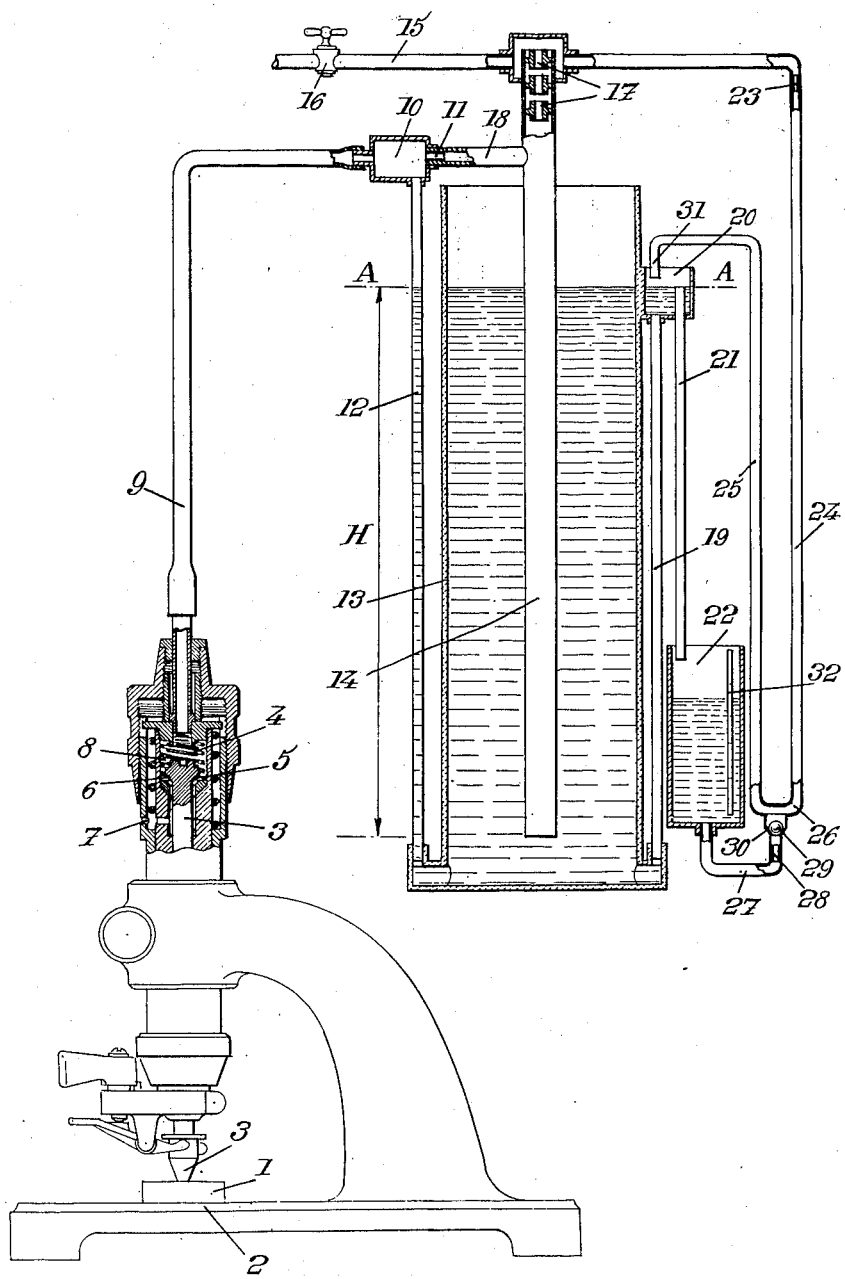
INVENTOR
Marcel Mennesson
BY
Bailey, Stephens & Huettig
ATTORNEYS Patented Aug. 28, 1951

2,565,616

UNITED STATES PATENT OFFICE 2,565,616

PRESSURE REGULATOR

Marcel Mennesson, Neuilly-sur-Seine, France, assignor to Societe Anonyme de Construction de Materiel Automobile (S. A. C. M. A.), Neuilly-sur-Seine, France, a society of the Republic of France Application January 21, 1948, Serial No. 3,498
In France March 14, 1947

2 Claims. (Cl. 137—53)

The present invention relates to pressure regulators and it is more especially, but not exclusively, concerned, among these devices, with those for determining the intake pressure of compressed air in pneumatic micrometry measurement apparatus.

It is known that an apparatus of this kind for measuring or checking a magnitude, in particular an external or internal dimension of a piece of work, includes means for causing a permanent gas, for instance compressed air, at practically constant pressure to flow successively through an upstream orifice and a downstream orifice into a medium, for instance the atmosphere, also at practically constant pressure. The section of the downstream orifice being made variable as a function of the value of the magnitude to be measured or checked, this value is obtained by observing, through manometric measurement of the gas pressure between the upstream orifice and the downstream orifice, the pressure drop undergone by the gas flowing through said downstream orifice.

Adjustment of the pressure of the gas fed to the upstream orifice to a constant predetermined value is effected by providing, between the source of compressed gas and the upstream orifice, a pressure regulator including a vessel filled with liquid in which dips a tube open at its lower end and in communication at its upper end with the compressed gas feed conduit, the top part of said vessel being in communication with the atmosphere. The depth to which the lower end of the tube is immersed in the liquid determines the pressure of the gas supplied to the apparatus and the excess of gas is eliminated, in the form of bubbles, through the open lower end of the tube and the liquid of the reservoir. As the tube occupies a fixed position with respect to the vessel, this pressure depends solely upon the level of the liquid and remains constant as long as this level does not change. In practice, it is necessary frequently to reestablish this level because a portion of the liquid disappears constantly through evaporation or due to its being carried away by the air bubbles. This variation of the level therefore involves difficulties and may cause errors in the measurements if it is not constantly remedied.

A simple method for obtaining a constant level consists in constantly feeding liquid to the vessel and permitting the excess of liquid to overflow, but this precaution cannot be always carried out in practice.

The present invention has for its object to obviate this difficulty.

With this object in view, according to a feature of the present invention, the liquid-vessel above referred to is provided with an auxiliary chamber in communication therewith and fed with liquid from a tank containing a reserve of said liquid, through pneumatic driving means in communication with a source of gas under pressure, and in particular the gas feed conduit leading to the upstream orifice, said auxiliary chamber being provided with an overflow which determines the height of the liquid therein and also in the main vessel and causes the liquid in excess to return to the reserve tank.

A preferred embodiment of my invention will be hereinafter described with reference to the accompanying drawings, given merely by way of example and in which:

The only figure of the drawing shows, in elevation, with parts in section, a pressure regulator made according to the invention and supplying gas to a utilization apparatus, when not in use.

The utilization apparatus is of any suitable construction. In the example shown by the drawing, this apparatus serves to measure the height of a piece 1 placed on a table 2 and against which a contact piece 3 is applied by a spring 4. Contact piece 3 is rigid with a valve 5 which is at a distance from its seat variable in accordance with the height of the piece, thus forming an interval 6 (downstream orifice) through which compressed air can escape into the atmosphere (discharge orifice 7). Compressed air is supplied to valve chamber 8 through a conduit 9 starting from a chamber 10, fed through a calibrated orifice 11 (upstream orifice). The air pressure existing in conduit 9, between the upstream orifice 11 and the downstream orifice 6 and which depends upon the section of flow through said orifice 6 and therefore upon the height of piece 1, is measured by means of a suitable manometer for instance a water manometer 12 which communicates with chamber 10.

In order to keep at a constant value the pressure of gas fed to intake or upstream orifice 11, it has already been proposed to make use of a vessel 13 containing water up to a given level A—A and in which is immersed a tube 14 open at the bottom and communicating at the top with the compressed air feed conduit 15. This feed conduit 15 is fitted with an adjustment cock 16 to permit of limiting the compressed air flow rate. This flow rate is regularized by means of a succession of calibrated orifices 17 called "expansion nozzles."

This flow rate must be sufficiently high to have a slight excess of air escaping at the bottom of tube 14 and ascending in the form of bubbles to the free surface of the liquid. In these conditions, there exists, in the portion of tube 14 between expansion nozzles 17 and the bottom of the tube, a constant pressure which corresponds to a height of H cms. of water as long as the water level corresponds to A—A.

Manometric tube 12 may, if so desired, and as shown, be connected to the lower part of vessel 13.

Obviously, the flow rate of the compressed air stream that flows toward the utilization apparatus through conduit 9 depends upon this pressure H and the device according to the present invention is intended to keep this pressure at a constant value.

To this effect, I connect with the lower part of vessel 13 and outside of the zone through which the excess of air escapes from the bottom of tube 14, an auxiliary tube 19 which opens, close to the constant level A—A, into a small chamber 20, in which the water level is obviously the same as in vessel 13. An overflow 21 prevents the water level from rising above A—A.

Any water in excess in chamber 20 flows out through overflow tube 21 and is collected in a tank 22, whence it is returned to chamber 20, as it will be hereinafter explained.

Return of the water reserve contained in tank 22 to chamber 20, and therefore to reservoir 13, takes place in the following manner:

A portion of the compressed air from conduit 15, instead of passing to expansion nozzles 17, flows through a jet 23 into a U-shaped tube including two branches 24 and 25 and supplied at the lower part 26 thereof with water from reserve tank 22 flowing through conduit 27.

A jet 28 determines the flow rate of water through said conduit and a ball 29 cooperates with a seat 30 to form a check valve therein. The compressed air pressure in branch 24 drives the water present at the lower part 26 of the U into branch 25 and causes it to ascend to the desired level. This water is then collected at 31 in chamber 20. The reserve tank 22 may be fitted with a level indicator 32.

This device works as follows:

Cock 16 being closed and the liquid level being suitably established in vessel 13, reserve tank 22 is filled with any suitable amount of water, for instance one sufficient to last for one week.

As tank 22 is being filled, ball 29 is moved upwardly and permits water to flow from tank 22 through jet 28 into tubes 24 and 25. The liquid level is then substantially at the same height in vessel 22 and in both tubes 24 and 25, account being taken of the weight of ball 29.

Cock 16 is then opened and a portion of the compressed air from conduit 15 flows through nozzles 17 and serves to the normal working of the apparatus as usual whereas the other portion, after having flown through nozzle 23, exerts a pressure on the water present in tube 24 and drives this water into tube 25. This exerts on ball 29 a pressure which tends to apply it against its seat 30, due to the fact that water ascends in tube 25 above the liquid level in tank 22.

Ball 29 is therefore applied against its seat 30 and stops the flow of water from tank 22 toward tubes 24 and 25. Water is driven off from tube 24 into tube 25 until compressed air arrives at the bottom of this tube 25 and air then flows up therein and drives water toward the outlet 31, where this water is discharged, in the form of droplets, into chamber 20. If the liquid level in vessel 13 is too low, it is also too low in chamber 20 and the amount of water supplied through 31 serves to fill up these containers until level A—A is restored. When the liquid level has thus been established or reestablished, any excess of water in chamber 20 immediately escapes through overflow 21 and returns into chamber 22 and the cycle is repeated.

Some points must be further clarified.

Ball 29 is subjected, in the course of operation, to two opposed pressures: A pressure corresponding to the difference of level between ball 29 and the surface of the liquid in reserve tank 22 and a pressure in the opposed direction due to the amount of water that is being elevated in tube 25.

Upward flow of water is possible only if the pressure due to the difference of level between ball 29 and the surface of the liquid in tank 22 is higher than a minimum value, for instance a pressure of 10 cms. of water (according to the diameter of tubes 24 and 25 and the dimensions of jets 23 and 28).

Ball 29 also serves to prevent, when the level in tank 22 is too low (for instance lower than the above mentioned minimum) compressed air from entering said tank 22.

A mark, traced on scale 32, permits of determining the time when it becomes necessary to add fresh liquid thereinto.

The device for regulating the pressure of a compressed gas (air) which has been above described may serve, not only to the feed of apparatus for measuring or checking a magnitude through pneumatic micrometry, but also to that of other apparatus for which inflow of a gas at a practically or rigorously constant pressure constitutes an essential condition.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for supplying a flow of gas at a constant pressure which comprises, in combination, a vessel open at the top to the atmosphere and filled with liquid up to a given level, a source of gas under pressure, a tube communicating at the top with said source and dipping to a certain depth in the liquid in said vessel, an outlet for the gas at constant pressure communicating with the top part of said tube, an auxiliary chamber in communication with said vessel below said liquid level therein, a liquid reserve tank located below the liquid level in said chamber, overflow means leading from said chamber to said reserve tank, and pneumatic means fed from said source of gas under pressure for elevating liquid from said reserve tank into said auxiliary chamber.

2. An apparatus for supplying a flow of gas at a constant pressure which comprises, in combination, a vessel open at the top to the atmosphere and filled with liquid up to a given level, a source of gas under pressure, a tube communicating at the top with said source and dipping to a certain depth in the liquid in said vessel, an outlet for the gas at constant pressure communicating with the top part of said tube, an auxiliary chamber in communication with said vessel below said liquid level therein, a liquid reserve tank located below the liquid level in said chamber, overflow means leading from said chamber to said reserve tank, a vertical U tube having one branch connected at the top with said source of gas under pressure and the other branch opening at the top above said auxiliary chamber, a conduit connecting the lower part of said reserve tank with the bottom of the U tube and a check valve in said conduit.

MARCEL MENNESSON.

REFERENCES CITED

The following references are of record in the file of this patent:

UNITED STATES PATENTS

| Number | Name | Date |
| --- | --- | --- |
| 32,030 | Martin | Apr. 9, 1861 |
| 1,225,416 | De Khatinsky | May 8, 1917 |
| 2,363,821 | Webster | Nov. 28, 1944 |

FOREIGN PATENTS

| Number | Country | Date |
| --- | --- | --- |
| 7,320 | Great Britain | 1837 |
| 116,151 | Austria | Feb. 10, 1930 |